(12) United States Patent
Zhu et al.

(10) Patent No.: US 8,750,417 B2
(45) Date of Patent: *Jun. 10, 2014

(54) MOBILE WIRELESS COMMUNICATIONS DEVICE WITH SEPARATE IN-PHASE (I) AND QUADRATURE (Q) PHASE POWER AMPLIFICATION AND POWER AMPLIFIER PRE-DISTORTION AND IQ BALANCE COMPENSATION

(71) Applicant: Blackberry Limited, Waterloo (CA)

(72) Inventors: Lizhong Zhu, Waterloo (CA); George Soliman Mankaruse, Kitchener (CA); Michael Stephen Corrigan, Waterloo (CA); Perry Jarmuszewski, Waterloo (CA); Oleksiy Kravets, Petersburg (CA); Kent Arnold Nickerson, Waterloo (CA); Nagula Tharma Sangary, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/956,408

(22) Filed: Aug. 1, 2013

(65) Prior Publication Data

US 2013/0315345 A1 Nov. 28, 2013

Related U.S. Application Data

(63) Continuation of application No. 13/526,430, filed on Jun. 18, 2012, now Pat. No. 8,526,535, which is a continuation of application No. 12/388,532, filed on Feb. 19, 2009, now Pat. No. 8,223,885.

(51) Int. Cl.
*H04L 25/49* (2006.01)

(52) U.S. Cl.
USPC ........... 375/297; 375/295; 375/296; 375/285; 375/219; 375/221; 455/91; 455/114.3; 455/114.2; 455/114.1; 455/115.1

(58) Field of Classification Search
USPC ................. 375/295, 296, 297, 285, 219, 221; 455/91, 114.3, 114.2, 114.1, 115.1
See application file for complete search history.

(56) References Cited

U.S. PATENT DOCUMENTS

| 5,132,645 A | 7/1992 | Mayer |
| 5,389,890 A | 2/1995 | Burrage |

(Continued)

FOREIGN PATENT DOCUMENTS

| GB | 2320381 | 6/1998 |
| WO | 9619063 | 6/1996 |

(Continued)

OTHER PUBLICATIONS

Andre et al., "High Efficiency, High Linearity GaN HEMT Amplifiers for WiMAX Applications," High Frequency Electronics, Jun. 2007, pp. 16, 18, 20, 22, 24, 25, 26, 28, 29.

(Continued)

*Primary Examiner* — Siu Lee
(74) *Attorney, Agent, or Firm* — Allen, Dyer, Doppelt, Milbrath & Gilchrist, P.A.

(57) ABSTRACT

A communications device, in one aspect as a portable wireless communications device, includes an in-phase modulator and power amplifier that receives a baseband I signal and modulates and amplifies the I signal. A quadrature modulator and power amplifier receives a baseband Q signal and modulates and amplifies the Q signal. A power combiner sums and outputs the I and Q signals. An I demodulator circuit receives a signal fed back from the I power amplifier and demodulates the fed back signal to produce demodulated I signals. A Q demodulator circuit receives a signal fed back from the Q power amplifier and demodulates the fed back signal to produce demodulated Q signals. A processor compares the digital, baseband I and Q signals with a demodulated I and Q signals to compensate for amplitude, frequency and phase modulation errors.

30 Claims, 7 Drawing Sheets

(56) References Cited

U.S. PATENT DOCUMENTS

| | | | |
|---|---|---|---|
| 5,886,573 | A | 3/1999 | Kolanek |
| 6,049,725 | A | 4/2000 | Emmert et al. |
| 6,519,448 | B1 | 2/2003 | Dress et al. |
| 6,760,010 | B1 | 7/2004 | Webb |
| 6,958,647 | B2 | 10/2005 | Rabinovich et al. |
| 6,975,686 | B1 | 12/2005 | Khatibzadeh et al. |
| 7,157,965 | B1 | 1/2007 | Kim |
| 7,161,989 | B1 | 1/2007 | Isaksen et al. |
| 7,929,917 | B1 | 4/2011 | Morris et al. |
| 8,059,777 | B2 * | 11/2011 | Wilhite et al. ............... 375/376 |
| 8,223,885 | B2 * | 7/2012 | Zhu et al. ...................... 375/296 |
| 8,451,941 | B2 * | 5/2013 | Zhu et al. ...................... 375/296 |
| 8,526,535 | B2 * | 9/2013 | Zhu et al. ...................... 375/296 |
| 2004/0087322 | A1 | 5/2004 | Aasgaard |
| 2005/0226340 | A1 | 10/2005 | Ahmed |
| 2006/0006946 | A1 | 1/2006 | Burns et al. |
| 2008/0132180 | A1 | 6/2008 | Manicone |
| 2008/0137772 | A1 | 6/2008 | Behzad et al. |
| 2008/0224689 | A1 | 9/2008 | Halverson et al. |
| 2010/0016032 | A1 | 1/2010 | Zhu et al. |
| 2010/0074367 | A1 | 3/2010 | Kim et al. |
| 2010/0097153 | A1 | 4/2010 | Rexberg et al. |
| 2010/0164629 | A1 | 7/2010 | Behzad et al. |
| 2011/0255575 | A1 | 10/2011 | Zhu et al. |
| 2012/0258677 | A1 | 10/2012 | Dupuy et al. |
| 2013/0243048 | A1 * | 9/2013 | Zhu et al. ...................... 375/219 |

FOREIGN PATENT DOCUMENTS

| | | |
|---|---|---|
| WO | 9966637 | 12/1999 |
| WO | 2006001557 | 1/2006 |

OTHER PUBLICATIONS

Ashtiani et al., "Direct Multilevel Carrier Modulation Using Millimeter-Wave Balanced Vector Modulators," IEEE Transactions on Microwave Theory and Techniques, vol. 46, No. 12, Dec. 1998, pp. 2611-2619.

Berretta et al., "A Balanced CDMA 2000 SiGe HBT Load Insensitive Power Amplifier," Radio and Wireless Symposium, 2006 IEEE, Jan. 2006, pp. 523-526.

Garcia et al., "An Adaptive Digital Method of Imbalances Cancellation in LINC Transmitters," IEEE Transactions on Vehicular Technology, vol. 54, No. 3, May 2005, pp. 879-888.

Grebennikov et al., "High-Efficiency Balanced Switched-Path Monolithic SiGe HBT Power Amplifiers for Wireless Applications," Proceedings of the 37th European Microwave Conference, Munich, Germany, Oct. 2007, pp. 1189-1192.

Gupta et al., "Adaptive Digital Baseband Predistortion for RF Power Amplifier Linearization," High Frequency Electronics, Sep. 2006, pp. 16, 18, 20, 22, 24, 25.

Luong et al., "Design of a Full-Custom Accurate I-Q Modulator," Proceedings of EPAC 2004, Lucerne, Switzerland, pp. 2029-2031.

Solbach et al., "Linearized Combiner Circuits for Power- and Low Noise-Amplifier Applications," Universitat Duisburg-Essen, pp. 1-3.

* cited by examiner

MOBILE WIRELESS COMMUNICATIONS DEVICE WITH SEPARATE IN-PHASE (I) AND QUADRATURE (Q) PHASE POWER AMPLIFICATION AND POWER AMPLIFIER PRE-DISTORTION AND IQ BALANCE COMPENSATION

TECHNICAL FIELD

The present disclosure relates to the field of communications devices, and more particularly, to mobile wireless communications devices and related methods.

BACKGROUND

Mobile wireless communications device have advanced radio frequency (RF) processing circuits and receive or transmit radio communications signals typically using modulation schemes with In-phase (I) and Quadrature (Q) modulation and demodulation circuits that sometimes create linearity issues with power amplifiers and sometimes suffer poor antenna match. This can cause some degradation of TRP (total radiated power) and raise harmonic interference issues because of the higher non-linearity of a power amplifier, as an example.

Commonly assigned and copending patent application Ser. No. 12/173,045 filed Jul. 15, 2008, the disclosure which is hereby incorporated by reference in its entirety, addresses some of these issues and uses a mobile wireless communications device having a housing and antenna mounted within the housing. Radio frequency (RF) circuitry is carried within the housing, such as typically on at least one circuit board. It includes a transceiver connected to the antenna through which RF communication signals are transmitted and received. A processor is operative with the RF circuitry. A transceiver includes an In-phase and Quadrature (I/Q) Modulation and Power Amplification circuit and includes an In-phase (I) circuit having an In-phase signal input and a modulator mixer and power amplifier circuit that receives the In-phase signal and amplifies the In-phase signal. A Quadrature (Q) circuit includes a Quadrature signal input and a modulator mixer and power amplifier circuit that receives the Quadrature signal and amplifies the Quadrature signal. A power combiner receives the separately amplified In-phase and Quadrature signals and sums and outputs the signals as a combined I and Q signal.

This type of circuit described in the incorporated by reference '045 application provides an IQ modulation and power amplification circuit with respective power amplifier circuits in each of the I and Q circuits. It allows greater control over any power amplifier driver and/or power amplifier biasing, even when using either open loop systems or the larger or smaller closed loop systems. It is possible for the quadrature hybrid power combiner to be tolerable to the mismatch of antenna load impedance and give greater reflectivity for phase and frequency modulation, allowing efficient amplitude modulation to occur by changing the bias of the power amplifier circuits for each of the I and Q circuits and give greater flexibility and circuit function.

It has been found that greater improvements in this circuit are desirable concerning linearity with respect to I and/or Q power amplifiers and I and Q amplitude and phase imbalance issues. It would also be advantageous to address efficiency issues of the I and Q power amplifiers when using a different radio frequency (RF) output power level.

BRIEF DESCRIPTION OF THE DRAWINGS

Other objects, features and advantages will become apparent from the detailed description which follows, when considered in light of the accompanying drawings in which.

DETAILED DESCRIPTION OF THE PREFERRED EMBODIMENTS

Figure 1:
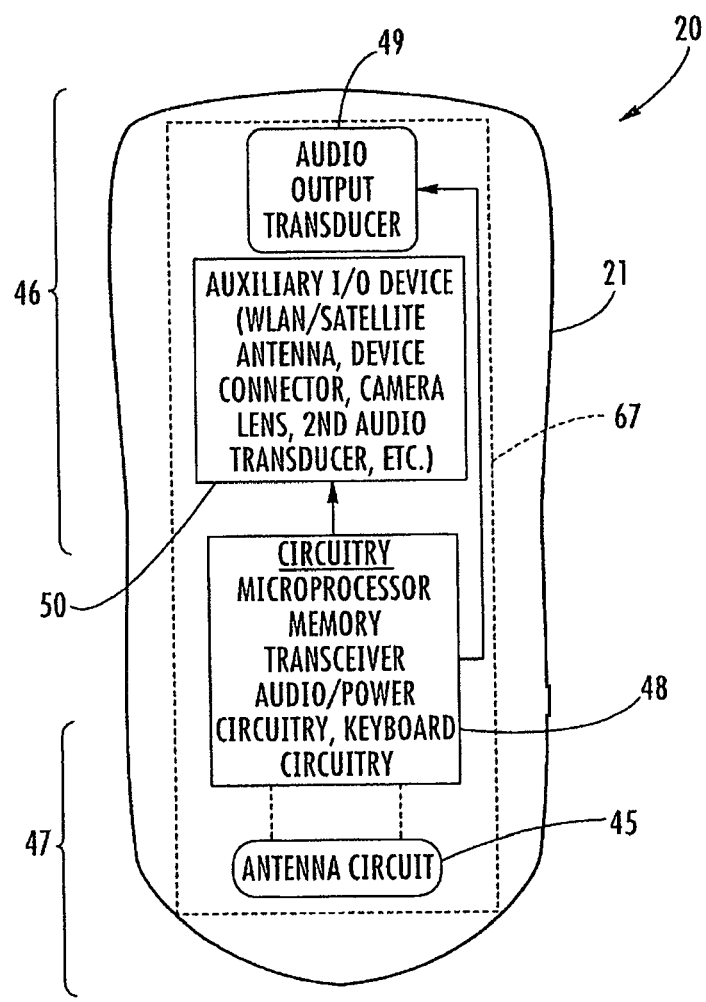
FIG. 1 is a schematic block diagram of an example of a mobile wireless communications device configured as a handheld device and illustrating basic internal components thereof as a non-limiting example.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

A communications device includes an In-phase (I) circuit having an in-phase modulator and mixer circuit and I power amplifier circuit that receives a digital, baseband I signal and modulates and amplifies the I signal. A Quadrature (Q) circuit includes a quadrature modulator and mixer circuit and a Q power amplifier circuit that receives a digital, baseband Q signal and modulates and amplifies the Q signal. A power combiner receives the separately amplified I and Q signals and sums and outputs the I and Q signals as a combined I and Q signal. An I demodulator circuit receives a signal fed back from the I power amplifier and demodulates the fed back signal to produce demodulated I signals. A Q demodulator circuit receives a signal fed back from the Q power amplifier and demodulates the fed back signal to produce demodulated Q signals. A processor compares the digital, baseband I and Q signals with a demodulated I and Q signals to compensate for amplitude, frequency and phase modulation errors wherein I and Q signal inputs are isolated from the combined I and Q signal to enhance antenna matching and transmit radiated power (TRP) and reduce harmonic emission from the respective I and Q power amplifier circuits.

In one aspect, the processor predistorts the digital I and Q signals fed to the I and Q circuits to aid in compensating for the amplitude, frequency and phase modulation errors. The respective in-phase modulator and mixer circuit can receive I_I and I_Q input signals to produce an I signal to the I power amplifier and the quadrature modulator and mixer circuit receives Q_I and Q_Q input signals to produce a Q signal to the Q power amplifier. The in-phase modulator and mixer circuit can be formed as a respective I_I mixer and I_Q mixer that receives respective I_I and I_Q signals and a frequency divider circuit associated with the I_I mixer and I_Q mixer for imparting a 90 degree phase shift and an I summer for receiving signals from the mixers and producing an I signal. The quadrature modulator and mixer circuit can be formed as a respective Q_I mixer and Q_Q mixer that receives respective Q_I and Q_Q signals and a frequency divider circuit associated with the Q_I mixer and Q_Q mixer for imparting a 90 degree phase shift and a Q summer for receiving signals from the mixers and producing a Q signal.

The processor can output control signals for controlling each of the power amplifier circuit and control respective biasing in each power amplifier circuit and adjust amplitude of a respective I or Q signal. In another aspect, each of the I and Q demodulator circuits can be formed as mixers and a frequency divider associated therewith for imparting a 90 degree phase shift.

In another aspect, an I/Q demodulator circuit can be connected to the processor and receives a signal from the output of the power combiner to aid in determining amplitude, frequency and phase modulation errors. A power detector can be connected to the processor and receives a signal from the output of the power combiner and outputs a signal that is compared with an original power for compensating for amplitude error. The power combiner can be formed as a 3 dB power combiner. The power combiner can also be formed as a quadrature hybrid power combiner.

In another aspect, a mobile wireless communications device can include the circuits as described and be formed as a housing with an antenna carried by the housing and at least one circuit board carried by the housing. Radio frequency (RF) circuitry can be carried by at least one circuit board and be formed as a transceiver connected to the antenna through which the RF communications signals are transmitted and received. A processor is carried by the at least one circuit board and operative with the RF circuitry. This processor can be the same processor that compares the digital, baseband I and Q signals with the demodulated I and Q signals to compensate for amplitude, frequency and phase modulation errors.

A method aspect is also set forth.

Figure 2:
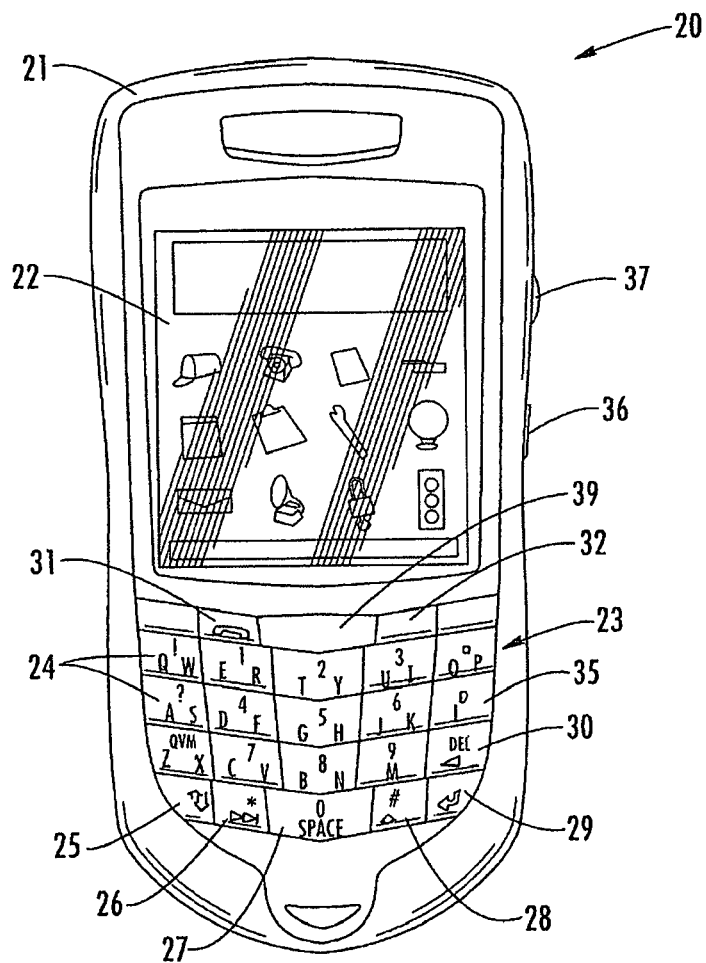
FIG. 2 is a front elevation view of the mobile wireless communications device of FIG. 1.
Figure 3:
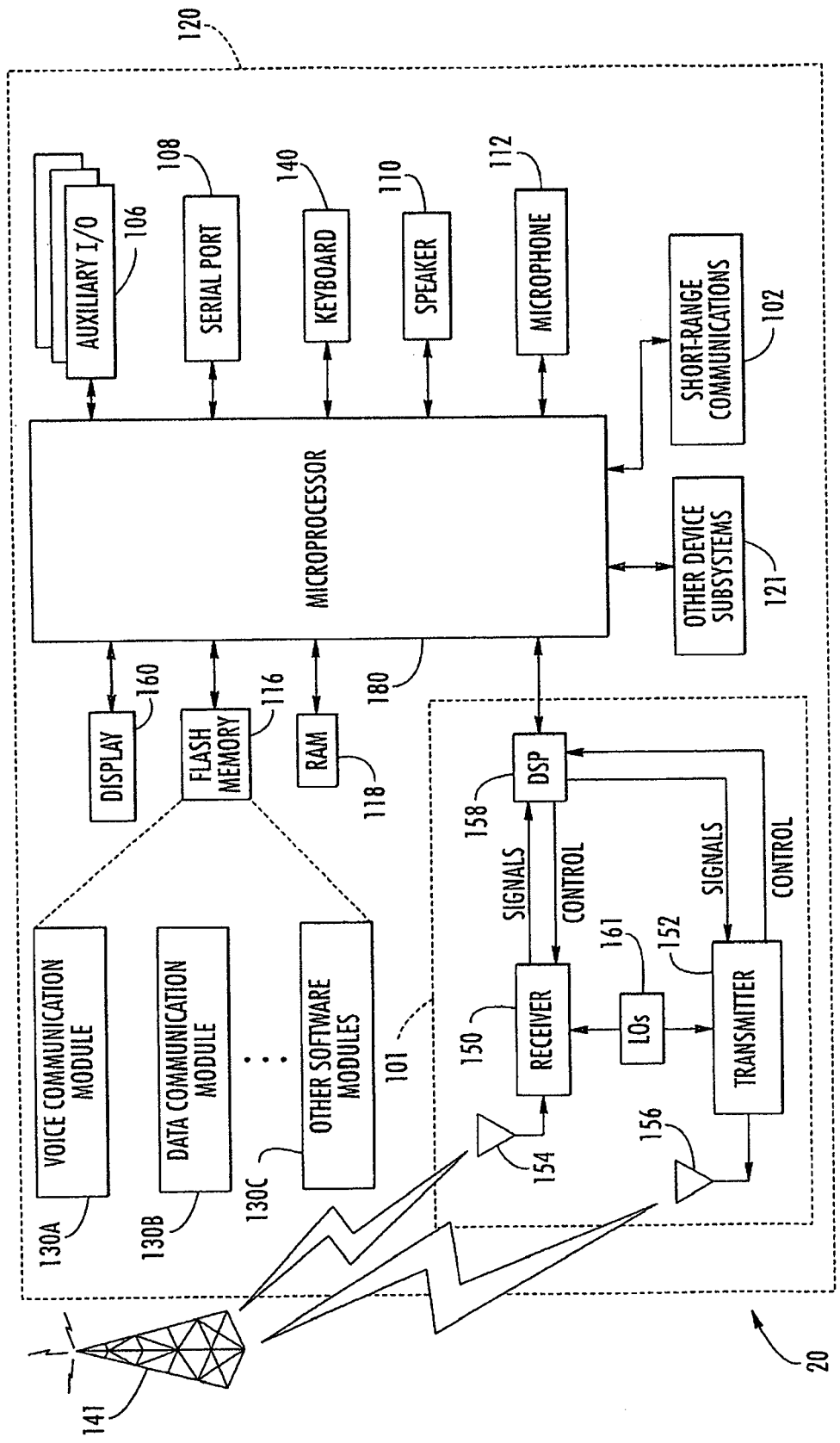
FIG. 3 is a schematic block diagram showing basic functional circuit components that can be used in the mobile wireless communications device of FIGS. 1-2.

A brief description will now proceed relative to FIGS. 1-3, which discloses an example of a mobile wireless communications device, for example, a handheld portable cellular radio, which can incorporate non-limiting examples of the various circuits, including the improved In-phase and Quadrature modulation and power amplification circuit as later described. FIGS. 1-3 are representative non-limiting examples of the many different types of functional circuit components and their interconnection, and operative for use in the circuits of the mobile wireless communications device that can incorporate the improvements, advantages and features as described.

Referring initially to FIGS. 1 and 2, an example of a mobile wireless communications device 20, such as a handheld portable cellular radio with improvements and advantages as described below is set forth. This device 20 illustratively includes a housing 21 having an upper portion 46 and a lower portion 47, and at least one dielectric substrate (i.e., circuit board) 67, such as a conventional printed circuit board (PCB) substrate, for example, carried by the housing. A number of different circuit boards can be used for supporting different components. For example, one circuit board could support the microprocessor and RF components, another circuit board could be formed as an antenna circuit board, and yet another circuit board could be formed as a circuit board for supporting different components such as a keyboard. The microprocessor could be positioned on another circuit board as compared to other RF components.

A housing (not shown in detail) would typically cover and enclose various components, such as one or more circuit boards and one or more antennae. The housing includes a housing case, for example, a plastic case. The housing case could support a separate housing cover for front and rear sides depending on the type of design. Any type of housing or housing case will allow access to any circuit board and supports the one or more circuit boards and one or more antennae. A battery opening provides access for a battery to power the device. The housing case could support one or more antennae in one non-limiting example, such as at its lower edge. The term circuit board 67 as used hereinafter can refer to any dielectric substrate, PCB, ceramic substrate or other circuit carrying structure for carrying signal circuits and electronic components within the mobile wireless communications device 20. The illustrated housing 21 is a static housing, for example, but it should be understood that a flip or sliding housing can be used as is typical in many cellular and similar telephones. These and other housing configurations with different housing case designs may be used.

Circuitry 48 is carried by the circuit board 67, such as a microprocessor, memory, one or more wireless transceivers (e.g., cellular, WLAN, etc.), which includes RF circuitry, including audio and power circuitry, and in this aspect, including any keyboard circuitry. This circuitry could also generally be termed RF circuitry. It should be understood that, as noted before, keyboard circuitry could be on a separate keyboard, etc., as will be appreciated by those skilled in the art. The different components as described can also be distributed on one circuit board or among a plurality of different circuit boards as noted before. A battery (not shown) is also preferably carried by the housing 21 for supplying power to the circuitry 48. The term RF circuitry could encompass the interoperable RF transceiver circuitry, including receive and transmit circuits and power circuitry, including charging circuitry and audio circuitry, including In-phase and Quadrature circuits that include respective power amplifier circuits for respective In-phase and Quadrature circuits.

In one aspect, an audio output transducer 49 (e.g., a speaker) is carried by an upper portion 46 of the housing 21 and connected to the circuitry 48. One or more user input interface devices, such as a keypad (keyboard) 23 (FIG. 2), is also preferably carried by the housing 21 and connected to the RF circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel 37 and a back button 36. Of course, it will be appreciated that other user input interface devices (e.g., a stylus or touch screen interface) may be used in other embodiments.

An antenna and associated antenna circuit 45 (FIG. 1) is preferably supported within the housing and in one aspect at a lower portion 47 in the housing, such as on the housing case lower edge. The antenna can be formed as a pattern of conductive traces that make an antenna circuit, which physically forms the antenna. It is operatively connected to the circuitry 48 on the main circuit board 67 or other circuitry on other boards. In one non-limiting example, the antenna could be formed on a separate antenna circuit board or an antenna circuit board section that extends from the main circuit board at the lower portion of the housing. Also, a separate keyboard circuit board could be used as noted before. Other circuit boards can be used for other components.

More particularly, a user will typically hold the upper portion of the housing 21 very close to their head so that the audio output transducer 49 is directly next to the ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances.

In some designs, the antenna 45 is placed adjacent the lower portion 47 of the housing 21 to allow for less impact on antenna performance due to blockage by a user's hand. Users typically hold cellular phones towards the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Another benefit of this type of configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

The device 20 further illustratively includes a display 22, for example, a liquid crystal display (LCD) carried by the housing 21 and connected to the circuitry 48. A back button 36 and scroll wheel 37 can also be connected to the circuitry 48 for allowing a user to navigate menus, text, etc., as will be appreciated by those skilled in the art. The scroll wheel 37 may also be referred to as a "thumb wheel" or a "track wheel" in some instances. The keypad 23 illustratively includes a plurality of multi-symbol keys 24 each having indicia of a plurality of respective symbols thereon. The keypad 23 also illustratively includes an alternate function key 25, a next key 26, a space key 27, a shift key 28, a return (or enter) key 29, and a backspace/delete key 30.

The next key 26 is also used to enter a "*" symbol upon first pressing or actuating the alternate function key 25. Similarly, the space key 27, shift key 28 and backspace key 30 are used to enter a "0" and "#", respectively, upon first actuating the alternate function key 25. The keypad 23 further illustratively includes a send key 31, an end key 32, and a convenience (i.e., menu) key 39 for use in placing cellular telephone calls, as will be appreciated by those skilled in the art.

Moreover, the symbols on each key 24 are arranged in top and bottom rows. The symbols in the bottom rows are entered when a user presses a key 24 without first pressing the alternate function key 25, while the top row symbols are entered by first pressing the alternate function key. As seen in FIG. 2, the multi-symbol keys 24 are arranged in the first three rows on the keypad 23 below the send and end keys 31, 32. Furthermore, the letter symbols on each of the keys 24 are arranged to define a QWERTY layout. The letters on the keypad 23 are presented in a three-row format, with the letters of each row being in the same order and relative position as in a standard QWERTY keypad.

Each row of keys (including the fourth row of function keys 25-29) is arranged in five columns in this non-limiting example. The multi-symbol keys 24 in the second, third, and fourth columns of the first, second, and third rows have numeric indicia thereon (i.e., 1 through 9) accessible by first actuating the alternate function key 25. Coupled with the next, space, and shift keys 26, 27, 28, which respectively enter a "*", "0", and "#" upon first actuating the alternate function key 25, as noted above, this set of keys defines a standard telephone keypad layout, as would be found on a traditional touch-tone telephone, as will be appreciated by those skilled in the art.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

In one non-limiting aspect, the antenna 45 is preferably formed as a multi-frequency band antenna, which provides enhanced transmission and reception characteristics over multiple operating frequencies. More particularly, the antenna 45 is designed to provide high gain, desired impedance matching, and meet applicable SAR requirements over a relatively wide bandwidth and multiple cellular frequency bands. By way of example, in one non-limiting example, the antenna 45 preferably operates over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well. In one non-limiting example, it is L-configured and positioned at the lower portion or edge of the support case.

The mobile wireless communications device shown in FIGS. 1 and 2 can incorporate email and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 20 of FIGS. 1 and 2 is further described in the example below with reference to FIG. 3. The device 20 illustratively includes a housing 120 shown in outline by the dashed lines, a keypad 140, and an output device 160. The output device 160 shown is preferably a display, which is preferably a full graphic LCD. Other types of output devices may alternatively be used. A processing device 180 such as a microprocessor is contained within the housing 120 and is coupled between the keypad 140 and the display 160. The processing device 180 controls the operation of the display 160, as well as the overall operation of the mobile device 20, in response to actuation of keys on the keypad 140 by the user.

The housing 120 may be elongated vertically, or may take on other sizes and shapes (including clamshell housing structures). The keypad may include a mode selection key, or other hardware or software for switching between text entry and telephony entry.

In addition to the processing device 180, other parts of the mobile device 20 are shown schematically in FIG. 3. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 20 is preferably a two-way RF communications device having voice and data communications capabilities. In addition, the mobile device 20 preferably has the capability to communicate with other computer systems via the Internet.

Operating system software executed by the processing device 180 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130A-130N on the device 20. A predetermined set of applications that control basic device-operations, such as data and voice communications 130A and 130B, may be installed on the device 20 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 141. Preferably, the PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161. The specific design and implementation of the communications subsystem 101 is dependent upon the communications network in which the mobile device 20 is intended to operate. For example, the mobile device 20 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 20.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 20 may send and receive communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 20. In addition, the display 160 may also be utilized in voice communications mode, for example to display the identity of a calling party, the duration of a voice call, or other voice call related information.

Any short-range communications subsystem enables communication between the mobile device 20 and other proximate systems or devices, which need not necessarily be similar devices. For example, the short-range communications subsystem may include an infrared device and associated circuits and components, or a Bluetooth™ communications module to provide for communication with similarly-enabled systems and devices.

Figure 4:
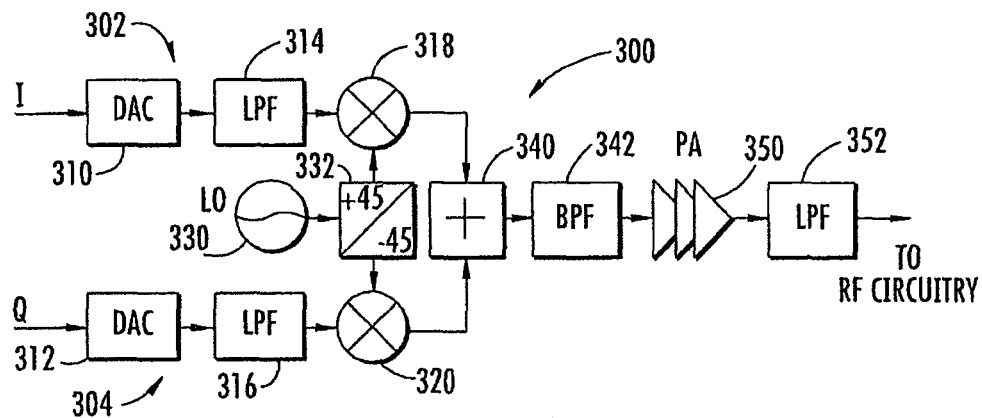
FIG. 4 is a block diagram of a conventional In-phase and Quadrature (I/Q) modulation and power amplification circuit showing one power amplification circuit after combining I/Q signals.

Referring now to FIG. 4, there is illustrated a block diagram of a conventional In-phase and Quadrature (I/Q) modulation and power amplification circuit illustrated generally at 300 that is typically used in many different types of communications devices, especially lower power mobile wireless communications devices. The circuit 300 has one power amplifier circuit after the In-phase and Quadrature modulation and mixing and power combining.

FIG. 4 shows this conventional I/Q modulation and power amplification circuit 300. It has In-phase and Quadrature inputs (I) and (Q) for a respective In-phase circuit 302 and Quadrature circuit 304 that each include a respective digital-to-analog converter (DAC) 310, 312, low pass filter 314, 316 and mixer 318, 320 as illustrated. A local oscillator 330 generates a local oscillator (LO) signal into a frequency divider 332, which passes the resulting and divided signals into the respective mixers 318, 320 as illustrated. The frequency divider 332 provides for +45 and −45 phase/frequency adjustment for I and Q modulation.

The output from the mixers 318, 320 are combined (or summed) at a power combiner 340 into one signal that is then bandpass filtered within a respective bandpass filter 342. One or more RF power amplifiers form a power amplifier circuit 350 amplifies the signal after bandpass filtering. The amplified signal is then filtered in a low pass filter 352. The filtered signal is passed to further RF circuits for other processing, including an antenna as part of any transmitter circuitry for signal transmission over-the-air. The modulation and power amplification circuit 300 shown in FIG. 4 may have linearity issues with the power amplifier (PA) circuit 350 and requires a more flexible IQ modulation scheme. This can be especially relevant when the power amplifier circuit design is used for 8 PSK (phase shift keying), quadrature amplitude modulation (QAM) and similar modulation schemes, typical in some lower power communications devices.

This conventional circuit 300 also may have a poor antenna match degrading total radiated power (TRP) and cause less efficiency because of the current power amplifier drawbacks, making it difficult to make improvements in radio frequency transmitter performance and battery life. Also, this type of conventional circuit 300 may have harmonics issues because of the higher non-linearity of the power amplifier. Some very high power I/Q modulation circuits such as in large and powerful base stations may use multiple power amplifiers that are power combined into an antenna, but they typically incorporate complex circuit features such as feed forward, feedback, free-distortion, complex mixing and complex power amplifier circuits. Those types of solutions are not always adequate for lower power mobile wireless communications device.

Some communications circuits for I/Q modulation incorporate parallel output stages. These are usually targeted to achieve better linearity in any power amplifier circuit. The parallel output stages are sometimes used for heat control, increased power output, signal quality, peak power improvement and similar aspects. These circuits still may suffer drawbacks and may not be as reliable or adapted for lower power application as indicated above.

Figure 5:
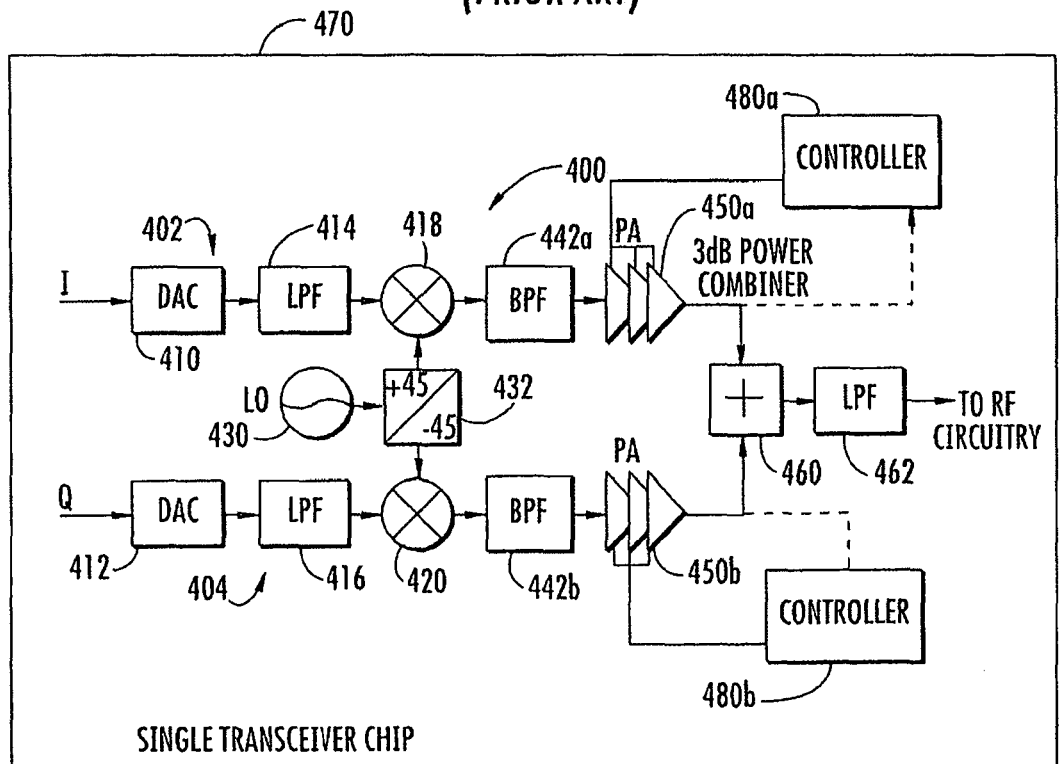
FIG. 5 is a block diagram of an In-phase and Quadrature modulation and power amplification circuit that includes a separate power amplifier circuit for each of the In-phase and Quadrature circuits in accordance the type of circuit described in the incorporated by reference and commonly assigned '045 patent application addressed above.
Figure 6:
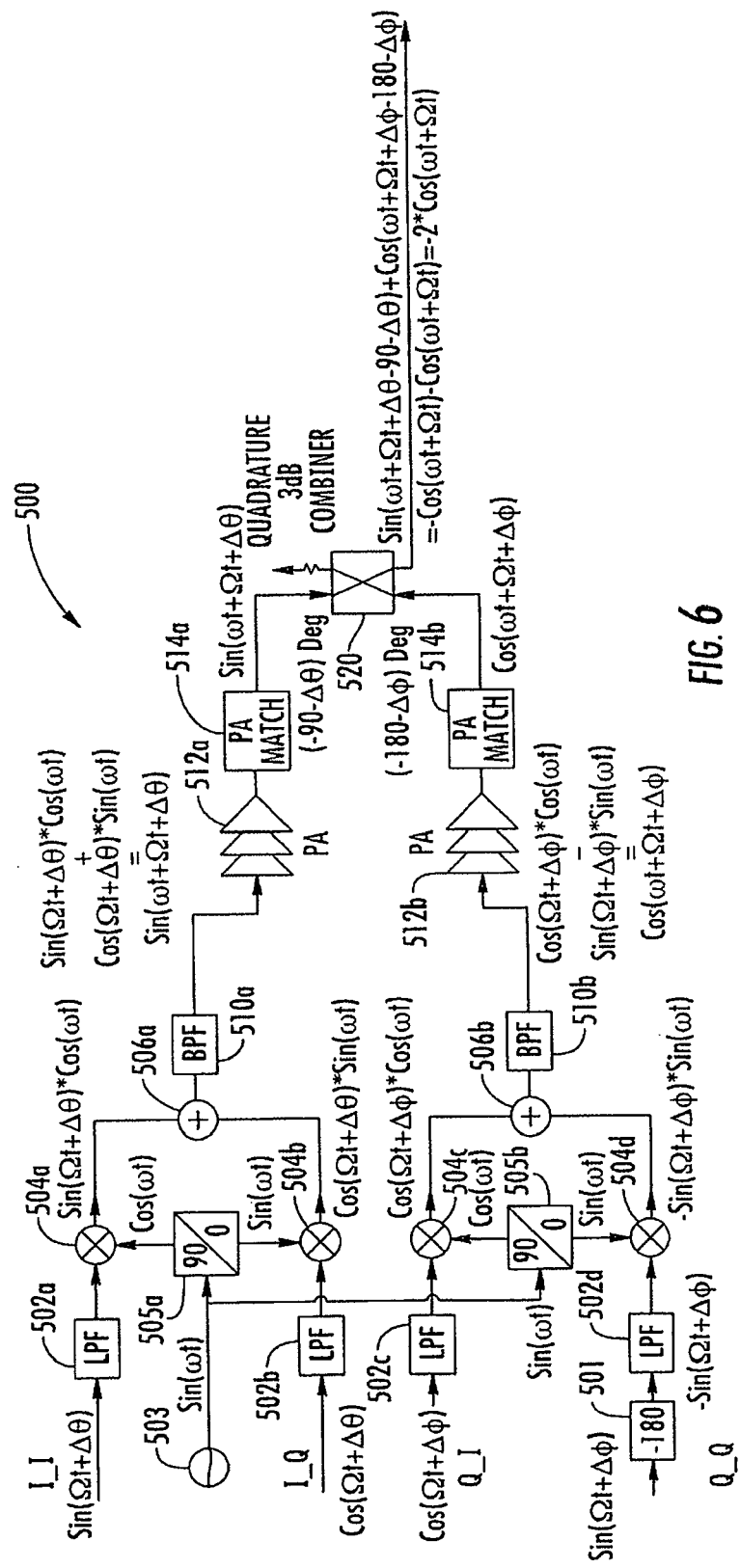
FIG. 6 is a block diagram showing a portion of an improved In-phase and Quadrature modulation and power amplification circuit compared to that of FIG. 5 and showing the resulting mathematical calculations associated with the functional components and showing the improvement when combining signals after the quadrature combiner, as illustrated.
Figure 7A:
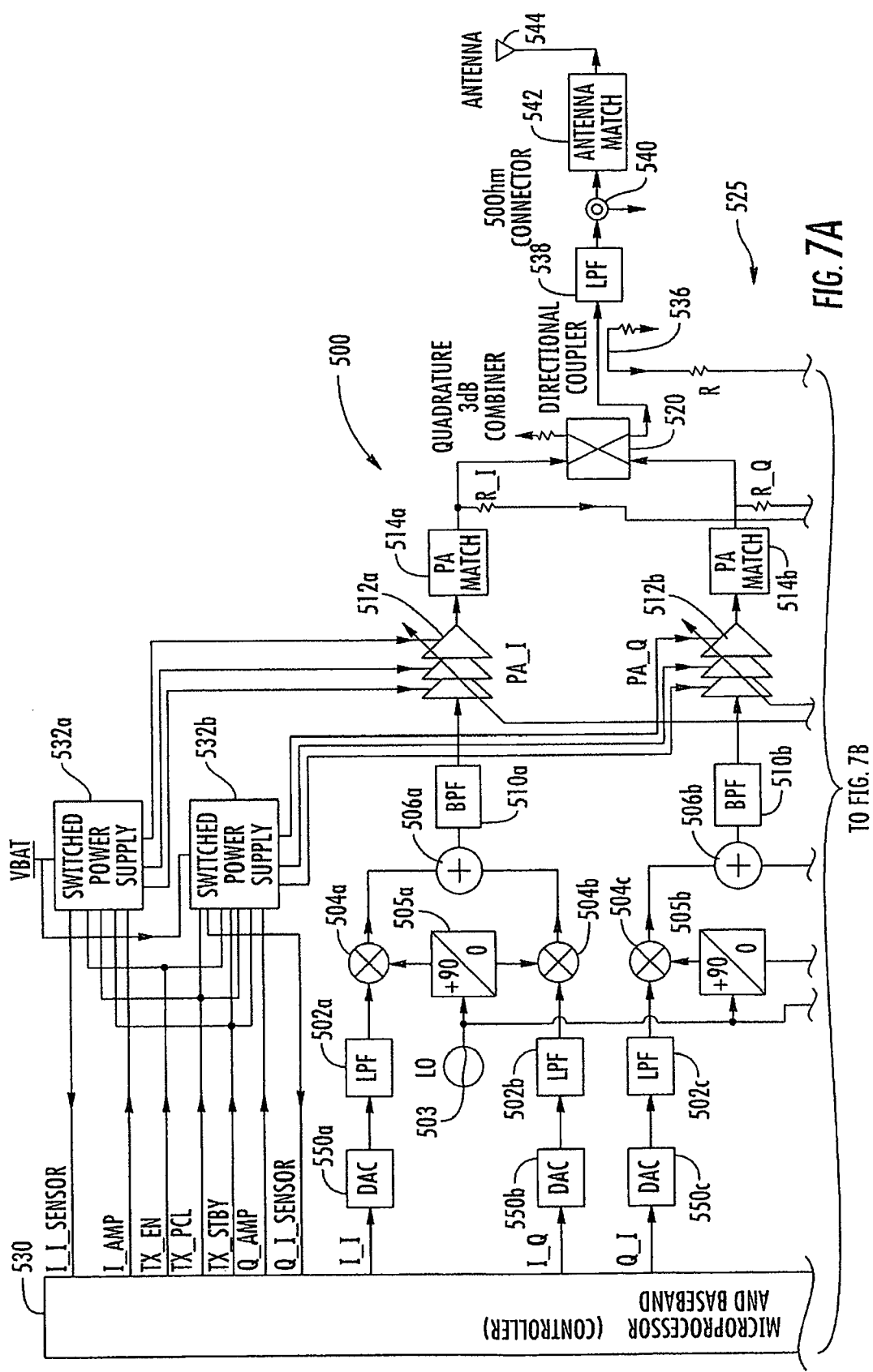
FIGS. 7A and 7B are block diagrams of an In-phase and Quadrature modulation and power amplification circuit in accordance with a non-limiting example and showing the complete functional circuit with feedback and feed forward to ensure IQ balance compensation.
Figure 7B:
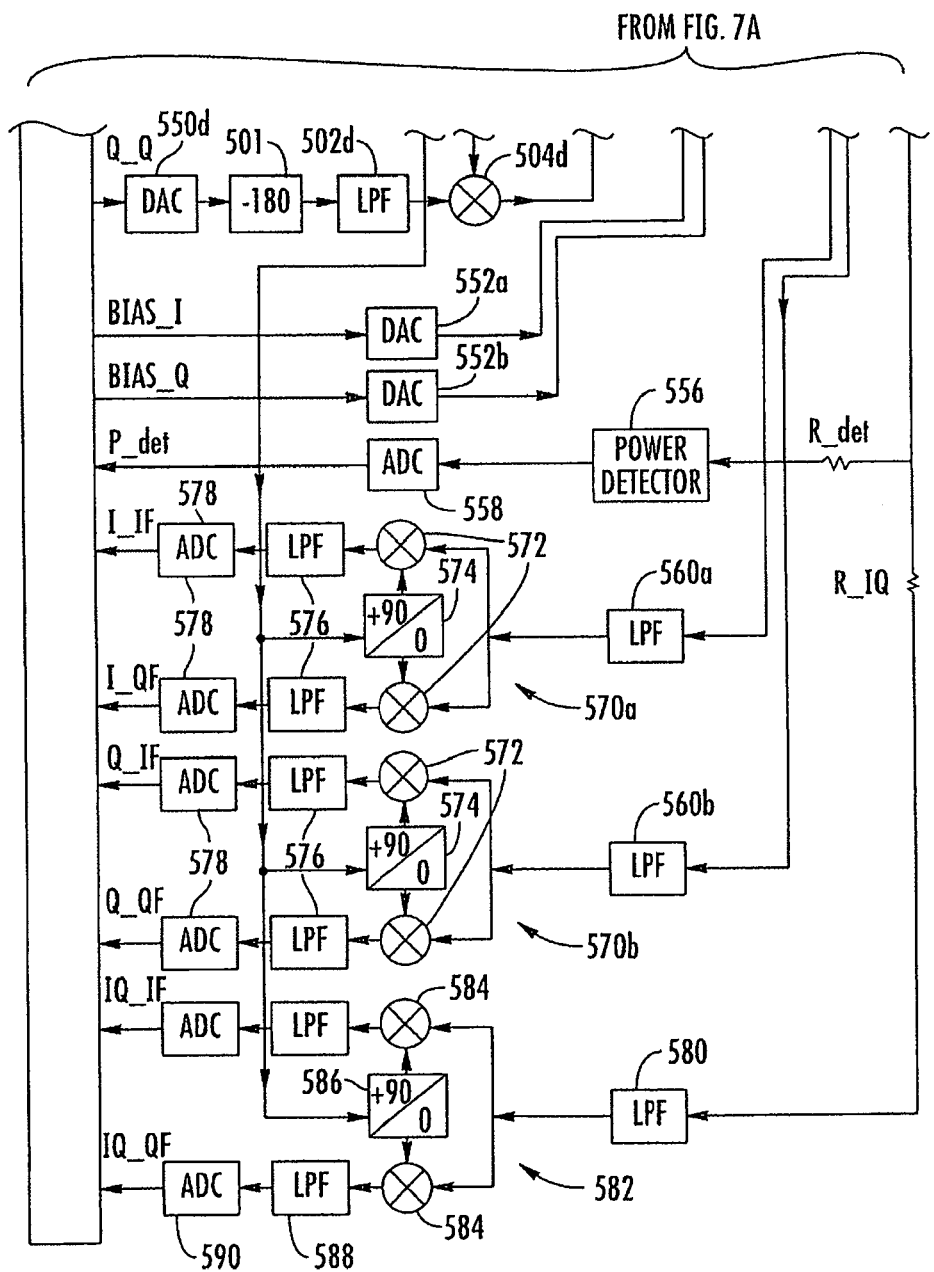

FIG. 5 is a block diagram of an IQ modulation and power amplification circuit 400 such as described in the commonly assigned and copending '045 application identified above that includes I/Q signal inputs and an In-phase circuit 402 and Quadrature circuit 404, including the basic components in each I/Q circuit 402, 404 of a respective DAC 410, 412, LPF 414, 416 and mixer 418, 420. These components are similar to components shown in FIG. 4, but with modifications that could be made as a result of the changes in each I/Q circuit 402, 404 to include a power amplifier circuit as described below. FIGS. 6, 7A and 7B describe improvements to the circuit described relative to FIG. 5, and the description of that circuit shown in FIGS. 6, 7A and 7B will proceed after describing the circuit in FIG. 5.

As shown in FIG. 5, each I/Q circuit 402, 404 includes a power amplifier circuit 450a, 450b that is used only for amplifying respective I or Q signals in the respective I/Q circuits 402, 404. The respective power amplifier circuit 450a, 450b is positioned into each of the respective In-phase and Quadrature circuits 402, 404. The local oscillator 430 and frequency divider circuits 432 can be similar as with the circuit of FIG. 4 with modifications as are necessary. After mixing within respective mixers 418, 420, the respective I and Q signals are each bandpass filtered within the respective bandpass filters 442a, 442b, and then each power amplified by respective power amplifier circuits 450a, 450b such that the separate In-phase and Quadrature signals are power amplified separately and not after being combined as in the circuit of FIG. 4. Afterward, the respective I and Q signals are power combined within a power combiner 460 and the resultant signal filtered within a low pass filter 462.

This I/Q modulation and power amplification circuit 400 in this non-limiting example uses two separate power amplifier circuits 450a, 450b with 3 dB less output power as compared to a more conventional single power amplifier circuit positioned after combining such as shown in FIG. 4, resulting in better linearity of the power amplifier circuit, while still maintaining the same output power through a 3 dB power combiner 460 as a non-limiting example. The power combiner 460 isolates the output from the input such that the circuit 400 can prevent a poor antenna match from directly affecting the power amplifier and radio frequency (RF) performance. With higher and more efficient power amplifier circuits 450a, 450b as described for each I/Q circuit 402, 404, it is possible to gain longer battery life. Because it is possible to use more linear power amplifiers, there is less harmonic emission from the power amplifier output.

IQ modulation is achieved with the circuit shown in FIG. 5, but also digital amplitude, frequency and phase modulation is achieved in an efficient manner. Better linearity and power-added efficiency occurs because of using smaller power amplifier circuits such as associated with a mobile wireless communications device to achieve a desired output power, for example, greater than 33 dBm. This type of I/Q modulation and power amplification circuit 400 allows a more flexible digital modulation for different modulation schemes with similar hardware architectures. It is also possible to implement the circuit 400 on a single transceiver chip such as shown by the line at 470 due to the use of the respective power amplifier circuits 450a, 450b, transmitting 3 dB less of RF power than a normal single power amplifier circuit 350 such as shown in FIG. 4. The IQ modulation and power amplification circuit 400 shown in FIG. 5 includes as a non-limiting example a 3 dB power combiner 460 such as a quadrature hybrid power combiner and provides an easier power amplifier match for better output power and immunity to mobile antenna impedance change. The power combiner 460 also allows the cancellation of even order transmit harmonics, which in turn, will make any harmonics filter design easier with less insertion loss and associated factors.

A quadrature hybrid power combiner 460 as a non-limiting example can be formed using different techniques and typically combines two, usually equal amplitude, quadrature-phased input signals into a single output signal. The combiner could use lumped element circuits, strip line circuits, or other circuits. The strip line circuits can be used in those applications requiring low loss or high power or both. Typically, a fundamental circuit element is a 3 dB quarter-wave coupler and formed as a four port network. The signal applied to a first port could be split equally between a second and third port with one of the outputs having a relative 90-degree phase shift. When the second and third ports are terminated into matching impedances, the signal applied to the first port is typically transmitted to a load connected to the second and third ports such that a fourth port receives negligible power and is "isolated." An impedance mismatch at the second port could reflect some signal power back from the second port to be divided proportionally between the first and fourth ports. It is also possible to vary the relative input/output phasing even though the relationship between the output ports is maintained at 90 degrees. It may be possible to form a lumped element construction with one or more toroidal cores. Typically in a lumped element design, the insertion loss is related to the Q values of different components used in the network. In a strip line component, however, the insertion loss can result from the resistance of conductors and a mismatch loss at input/output ports and directivity loss. Thicker conductors could reduce some of that loss.

The I/Q modulation and power amplification circuit 400 shown in FIG. 5 overcomes the technical drawbacks and problems associated with the type of circuit 300 shown in FIG. 4 in which only one power amplifier circuit 350 is used after power combining, especially with power amplifier designs for GSM/GPRS/EDGE systems to achieve both GMSK and 8 PSK. Different RF transceiver systems have different transceiver architectures for digital frequency and phase modulations with IQ modulation.

The I/Q modulation and power amplification circuit 400 of FIG. 5 with respective power amplifier circuits 450a, 450b in each of I and Q circuits 402, 404 allows greater control over any power amplifier driver and/or power amplifier biasing, even when using either open loop systems or larger or smaller closed loop systems. Controllers 480a, 480b (or one controller) are operative with the respective power amplifier circuit 450a, 450b and controls gain and other factors. The controllers 480a, 480b can be open loop or closed loop control (as shown by the dashed feedback line in each circuit). The I/Q modulation and power amplification circuit 400 shown in FIG. 5 unifies the IQ modulation scheme with linear/higher efficiency/higher power requirements of power amplifier designs such that different types of digital modulations, for example, AM, FM and PM can be fulfilled. Also, the two respective power amplifier circuits 450a, 450b shown in FIG. 5 can be calibrated to achieve high linear/efficiency/power amplifier design with low harmonics and less sensitivity to antenna loading.

In one non-limiting aspect, the power combiner 460 is operative as a 3 dB quadrature hybrid combiner as noted before. With this circuit design as described, two power amplifier circuits 450a, 450b could be used with only 30 dBm (1 watt) output power to achieve 33 dBm. The loss due to the power combiner 460 could be about 0.2 to about 0.3 dB, which could handled using a sharp low pass filter 462 to force down the third harmonics of the power amplifier. Thus, it is possible that the power amplifier circuits 450a, 450b with 30 dBm output can be established to achieve 33 dBm output. Typically, using the 3 dB quadrature hybrid power combiner 460, it is possible to isolate the antenna matching from the power amplifier matching to obtain better transmission radiated power (TRP). As a result, the antenna design does not require more than one feed port to incorporate the power combiner as described.

It should be understood that the quadrature hybrid power combiner 460 can be tolerable to the mismatch of an antenna load impedance. Also, the quadrature hybrid gives greater reflectivity for phase and frequency modulation. Thus, efficient amplitude modulation can occur by changing the bias of the power amplifier circuits 450a, 450b for each of the In-phase and Quadrature circuits 402,404 and give greater flexibility in circuit function.

FIGS. 6, 7A and 7B show an improvement over the I/Q modulation and power amplification circuit shown in FIG. 5 in which the linearity is improved with respect to each I and Q power amplifier shown in FIG. 5. Also, the I and Q amplitude and phase imbalance issues are improved and the efficiency issues of I and Q power amplifiers with different RF output power levels is enhanced. As noted before, the circuit shown in FIG. 5 includes a controller 480a, 480b that controls the feedback loop, for example, for the purpose of pre-distortion. The circuit shown in FIGS. 6, 7A and 7B provides greater efficiency to how the controller, shown as microprocessor and baseband processor 530, can be configured and uses the circuitry to effect better control, while also provides for better current sensing and a controlled power supply. When describing these components, reference numerals begin in the 500 series.

A double I/Q modulation scheme is illustrated in FIG. 6. Signals from the power amplifiers combine in a better and more efficient manner and a double I_Q modulator system is used as illustrated with the use of complex I and Q coefficients to form I_I, I_Q, Q_I, and Q_Q signal components shown as the signal inputs. The mathematical functions are illustrated. The Q_Q signal component is inverted 180 degrees by circuit 501. Each signal passes through a respective low pass filter 502a-d and into mixers 504a-d. The circuits form a respective In-phase modulator and mixer circuit and Quadrature modulator and mixer circuit and forms respective Q_I mixer, Q_Q mixer and I_I and I_Q mixers. A sine signal generated from a frequency generator as a local oscillator (LO) 503 is passed into a 90-degree frequency divider circuit 505a, 505b to add cosine and sine function 90-degree phase shifts for each of the respective I_I, I_Q, Q_I, and Q_Q signals as illustrated. After mixing, the respective signals pass into a respective I and Q summer 506a, 506b and through a respective I and Q bandpass filter 510a, 510b into the respective I and Q power amplifiers 512a, 512b. The signal output from the power amplifiers 512a, 512b each passes through a respective I and Q power amplifier matching circuit 514a, 514b and are combined in the 3 dB quadrature combiner 520. The mathematics showing that the proper combining of signals can occur is illustrated.

The double I/Q modulator circuit in FIG. 6 is shown generally at 500 in FIGS. 7A and 7B, which is part of the larger circuit forming the I and Q modulation and power amplification circuit shown generally at 525, receives the I_Q, Q_I, and Q_Q signals as digital, baseband signals (I and Q signals) from the microprocessor and baseband processor shown generally at 530, which acts a controller and is also referred herein as a processor or controller. The circuit as shown in FIGS. 7A and 7B includes a respective I and Q switched power supply 532a, 532b for each of the I and Q power amplifiers 512a, 512b also identified as PA_I and PA_Q. The output from the quadrature 3 dB combiner 520 is output into a directional coupler 536 and signals are output through a low pass filter 538 and a connector 540, which in the instant non-limiting example is a 50-ohm connector. The signal passes from the connector 540 into an antenna match circuit 542 and is transmitted as a signal output through the antenna 544.

Signals such as various control signals are received into the switched power supply 532a, 532b and other signals are fed back to the processor 530, for example, as I_I and Q_I sensor signals. The switched power supply circuits 532a, 532b receive various amplitude, sensor and other related signals from the processor 530 as illustrated.

It should be understood that each of the I_I, I_Q, Q_I and Q_Q signals from the processor 530 are generated as digital signals and pass through a respective digital-to-analog converter 550 before passing into the respective low pass filters 502a-d. Bias signals for the I and Q signals are generated from the processor 530 and each pass through a digital-to-analog converter (DAC) 552a, 552b and into respective I and Q power amplifiers 512a, 512b to provide bias control to the amplifiers. A power detect signal is received from the directional coupler 536 via resistor R and R-det and into a power detector circuit 556 and passes through the analog-to-digital converter (ADC) 558 to be received by the processor 530. Signals from the power amplifier match circuit 514a, 514b are received into low pass filters 560a, 560b for respective I and Q demodulator circuits 570a, 570b that each include the appropriate mixers 572, phase shifter and frequency dividers 574 and low pass filters 576 and analog-to-digital converters (ADC) 578 for each of the I and Q demodulator circuits 570a, 570b. The signal outputs include an I_IF signal, I_QF signal, Q_IF signal, and Q_QF signal. A signal from the directional coupler 536 also passes through an R_IQ resistor and through a low pass filter 580 into another IQ demodulator 582 as illustrated, which includes mixers 584, frequency divider 586, low pass filters 588 and ADC 590.

In operation, a very small portion (about −30 dB, or 0.1%) is taken out of the I_PA (512a) output (the same is done at Q_PA (512b) output and the I signal is described as an example). The signal passes through the low pass filter 560a and is demodulated via the IQ demodulator, and in this example, the I demodulator 570a. The demodulated I and Q baseband signals will be low pass filtered and analog-to-digitally converted in respective circuits 576, 578. These demodulated digital I and Q signals will be compared with the digital I and Q portions of the original I baseband digital output signal to the I/Q modulator 500. The amplitude, frequency and phase modulation errors will be detected. After analyzing the error messages, proper digital adjustments will be made on the I digital output signal in this example. Also, proper adjustment to improve the linearity of the I_PA power amplifier 512a can be done via an I_am (amplitude) signal to the I_PA bias control (Bias_I). The adjustment to further the amplitude modulation can also be done via an I_AMP signal from the processor to the I_PA power supply voltage 532a. As to the Q side, the same can be accomplished.

In order to achieve the optimal and balanced IQ modulated PA output signal, the directional coupler 518 with about 20 dB coupling factor is added at 3 dB quadrature output from the quadrature combiner 520. The coupled signal via resistor R will be divided into two parts. One part of the signal is matched to the input of the power detector circuit 556 via the R_det resistor. The analog output of the detector 556 will be A/D converted by the ADC into 558 a digital signal and compared with the original Vramp[=(I_am+Q_am)/2]. The error will be corrected by pre-distorting I_am and Q_am (amplitude) signals to compensate for the amplitude error. The other part of the signal will be matched to the input of the low pass filter (LPF) 580 via resistor R_IQ. The low pass filter 580 will remove the harmonics of the transmitted frequencies. The filtered signal will be demodulated by the 3rd IQ demodulator 582. IQ_QF and IQ_QF signals as the output will represent the demodulated digital I and Q signals. These signals will be compared with original digital signals I and Q by the processor 530. The amplitude, phase and frequency errors are detected. These errors will be corrected by pre-distorting the digital I and Q signals before being fed into the D/A converters 550 and the IQ modulators, respectively. This, of course, corresponds to the feed forward process.

As noted before, by using I and Q PA's 512a, 512b to replace the conventional one PA solution, switched power supplies 532a, 532b are used for I and Q PA's 512a, 512b, respectively. The I or Q PA's 512a, 512b will consume about half of the current to allow the system to use commercially available switched power supplies 532a, 532b. The I and Q PA's 512a, 512b will be controlled by TX_EN signal from the processor 530 to turn on the amplifier. The supply voltage to both amplifiers will be set by TX_PCL signal from the processor 530 with respect to the transmitted power. The higher the output power (i.e., higher PCL level), the higher the supply voltage, which is also corresponding to I_am and Q_am for the amplifiers' bias setting. By adjusting both amplifiers' bias and supply voltage, the system places the amplifiers into the most DC power efficient operating condition. I_I_sensor and Q_I_sensor signals received from the I and Q power supplies into the processor will also be used to monitor the currents flowing into the amplifiers respectively, in order for better bias control of the amplifiers. I_AMP and Q_AMP signals back to the power supplies can be used for (1) analog and/or digital amplitude modulation; (2) Pre-distortion for the power amplifier linearization; and (3) dynamically adjusting the supply voltage during each burst for better amplifier's dynamic range. A TX_STBY signal is used to keep the switched power suppliers in standby mode in order to be ready for next instant transmission.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications device comprising:
   an In-phase (I) circuit configured to modulate and amplify a digital, baseband I signal;
   a Quadrature (Q) circuit configured to modulate and amplify a digital, baseband Q signal;
   a power combiner configured to receive the separately modulated and amplified I and Q signals and output a combined I and Q signal;
   an I demodulator circuit configured to demodulate a feedback signal directly coupled from the I circuit and produce a demodulated I signal;

a Q demodulator circuit configured to demodulate a feedback signal directly coupled from the Q circuit and produce a demodulated Q signal; and a processor configured to compare the digital, baseband I and Q signals with the demodulated I and Q signals to compensate for at least one error.

2. The communications device according to claim 1, wherein the at least one error comprises at least one of an amplitude error, a frequency error, and a phase modulation error.

3. The communications device according to claim 1, wherein the processor is configured to predistort the digital baseband I and Q signals fed to the I and Q circuits.

4. The communications device according to claim 1, wherein the I circuit comprises an I modulator and mixer circuit and an I power amplifier circuit coupled thereto; and wherein the Q circuit comprises a Q modulator and mixer circuit and a Q power amplifier circuit coupled thereto.

5. The communications device according to claim 4, wherein the I modulator and mixer circuit receives I_I and I_Q input signals to produce an I signal to the I power amplifier; and wherein the Q modulator and mixer circuit receives Q_I and Q_Q input signals to produce a Q signal to the Q power amplifier.

6. The communications device according to claim 5, wherein the I modulator and mixer circuit comprises an I_I mixer and I_Q mixer configured to receive respective I_I and I_Q signals and a frequency divider circuit associated therewith configured to impart a ninety degree phase shift, and an I summer configured to receive signals from the mixers and produce an I signal.

7. The communications device according to claim 5, wherein the Q modulator and mixer circuit comprises a Q_I mixer and Q_Q mixer configured to receive respective Q_I and Q_Q signals and a frequency divider circuit associated therewith configured to impart a ninety degree phase shift, and a Q summer configured to receive signals from the mixers and produce a Q signal.

8. The communications device according to claim 4, wherein the processor is configured to output control signals for controlling each of the power amplifier circuits, and control respective biasing in each power amplifier circuit.

9. The communications device according to claim 4, wherein each of the I and Q demodulator circuits comprise mixers and a frequency divider associated therewith configured to impart a ninety degree phase shift.

10. The communications device according to claim 1, further comprising an I/Q demodulator circuit connected to the processor and configured to receive a signal from the output of the power combiner.

11. The communications device according to claim 1, further comprising a power detector connected to the processor and configured to receive a signal from the output of the power combiner and output a signal that is compared with an original power.

12. The communications device according to claim 1, wherein the power combiner comprises about a 3 dB power combiner.

13. The communications device according to claim 1, wherein the power combiner comprises a quadrature hybrid power combiner.

14. A mobile wireless communications device comprising:
a housing;
an antenna carried by the housing;
at least one circuit board carried by the housing and including radio frequency (RF) circuitry carried by the at least one circuit board and comprising an In-phase (I) circuit configured to modulate and amplify a digital, baseband I signal, a Quadrature (Q) circuit configured to modulate and amplify a digital, baseband Q signal, a power combiner configured to receive the separately modulated and amplified I and Q signals and output a combined I and Q signal, an I demodulator circuit configured to demodulate a feedback signal directly coupled from the I circuit and produce a demodulated I signal, a Q demodulator circuit configured to demodulate a feedback signal directly coupled from the Q circuit and produce a demodulated Q signal, and a processor configured to compare the digital, baseband I and Q signals with the demodulated I and Q signals to compensate for at least one error.

15. The mobile wireless communications device according to claim 14, wherein the at least one error comprises at least one of an amplitude error, a frequency error, and a phase modulation error.

16. The mobile wireless communications device according to claim 14, wherein the processor predistorts the digital baseband I and Q signals fed to the I and Q circuits.

17. The mobile wireless communications device according to claim 14, wherein the I circuit comprises an I modulator and mixer circuit and an I power amplifier circuit coupled thereto; and wherein the Q circuit comprises a Q modulator and mixer circuit and a Q power amplifier circuit coupled thereto.

18. The mobile wireless communications device according to claim 17, wherein the I modulator and mixer circuit is configured to receive I_I and I_Q input signals to produce an I signal to the I power amplifier; and wherein the Q modulator and mixer circuit is configured to receive Q_I and Q_Q input signals to produce a Q signal to the Q power amplifier.

19. The mobile wireless communications device according to claim 18, wherein the I modulator and mixer circuit comprises an I_I mixer and I_Q mixer configured to receive respective I_I and I_Q signals and a frequency divider circuit associated therewith configured to impart a ninety degree phase shift, and an I summer configured to receive signals from the mixers and produce an I signal.

20. The mobile wireless communications device according to claim 18, wherein the Q modulator and mixer circuit comprises a Q_I mixer and Q_Q mixer configured to receive respective Q_I and Q_Q signals and a frequency divider circuit associated therewith configured to impart a ninety degree phase shift, and a Q summer configured to receive signals from the mixers and producing a Q signal.

21. The mobile wireless communications device according to claim 17, wherein the processor is configured to output control signals for controlling each of the power amplifier circuits, and control respective biasing in each power amplifier circuit.

22. The mobile wireless communications device according to claim 17, wherein each of the I and Q demodulator circuits comprise mixers and a frequency divider associated therewith configured to impart a ninety degree phase shift.

23. The mobile wireless communications device according to claim 14, further comprising an I/Q demodulator circuit connected to the processor and configured to receive a signal from the output of the power combiner.

24. The mobile wireless communications device according to claim 14, further comprising a power detector connected to the processor and configured to receive a signal from the output of the power combiner and output a signal that is compared with an original power.

25. The mobile wireless communications device according to claim 14, wherein the power combiner comprises about a 3 dB power combiner.

26. The mobile wireless communications device according to claim 14, wherein the power combiner comprises a quadrature hybrid power combiner.

27. The mobile wireless communications device according to claim 14, wherein the RF circuitry is configured to generate Global Systems for Mobile (GSM) packet bursts.

28. A method of operating a communications device comprising:

modulating and amplifying a digital, baseband In-phase (I) signal using an I circuit;

modulating and amplifying a digital, baseband Quadrature (Q) signal using a Q circuit outputting a combined I and Q signal using a power combiner receiving the separately modulated and amplified I and Q signals;

demodulating a feedback signal directly coupled from the I circuit using an I demodulator to produce a demodulated I signal;

demodulating a feedback signal directly coupled from the Q circuit using a Q demodulator to produce a demodulated Q signal; and comparing the digital, baseband I and Q signals with the demodulated I and Q signals using a processor to compensate for at least one error.

29. The method according to claim 28, wherein the at least one error comprises at least one of an amplitude error, a frequency error, and a phase modulation error.

30. The method according to claim 28, further comprising using the processor to predistort the digital baseband I and Q signals fed to the I and Q circuits.

* * * * *